Patented Feb. 25, 1941

2,233,259

UNITED STATES PATENT OFFICE 2,233,259

MANUFACTURE COMPRISING FOLIATED GLASS AND PROCESS OF PRODUCING THE SAME

Philip E. Harth, Clayton, Mo.

No Drawing. Application February 7, 1934, Serial No. 710,130

12 Claims. (Cl. 49—77)

This invention relates to a manufacture comprising foliated glass and a process of producing the same.

One of the objects of this invention is to develop and produce a foliated glass in the form of leaves, thin plates, or laminae, capable of employment for various uses in the arts.

Another object of this invention is to provide a coating composition which has the property of being highly resistant to the action of weather, chemicals, heat, sunlight, and the like.

Other objects are to modify the characteristics of such foliated glass from the standpoint of transparency, opalescence, color, surface treatment, surface coating, heat-resisting and heat-insulating properties.

Further objects will appear from the detail description, in which will be described a number of embodiments of this invention from a manufacture and process standpoint, as well as mode of employment and use in the arts. It is to be understood that "glass" is used in a descriptive, and not in a limitative, sense.

In accordance with the present invention, glass is attenuated until it reaches a foliated condition, in which the glass is in the form of leaves, thin plates, or laminae. This may be accomplished in an illustrative manner, by blowing the glass into a bubble until it breaks or fractures. Upon such attenuation and fracturing, the glass becomes foliated and in the form of extremely thin, flat leaves, plates, or laminae, which may be as small as a micron in thickness. Such foliated glass now has distinct properties and characteristics, enabling its employment in the various arts. The procedure of blowing may be performed in any suitable manner and in any suitable chamber, at the proper temperature.

One of the uses for which such foliated glass is particularly adapted is as a coating for various purposes and uses, including its use as a paint. In order to adapt it for that purpose, the foliated glass may be comminuted to and desired mesh size, which can be accomplished in a ball or pebble mill, or by means of mullers, whereby the surface area of the laminae may be reduced to a suitable size, the comminuting operation being conveniently performed in water. The comminuted foliated glass can now be classified to a suitable mesh, which can be accomplished by clasifiers, flotation, or screens. Thus, for use as a coating, and particularly for use as a paint, the screen mesh can be 325 per lineal inch. Where the material has been comminuted by water grinding, it can be filtered or centrifuged in the usual manner and then further dried in any suitable manner.

Where it is desired to employ the manufacture in its transparent form, the glass may be suitably de-colorized in a known manner, employing the usual de-colorizing agents. An opaque or opalescent foliated glass may, however, be secured by employing an ordinary opalescent glass mixture, such as one composed of sand, soda, lime, and cryolite, with or without potash. Where it is desired to secure a colored foliated glass, then any desired color may be secured by the employment of suitable coloring agents in the glass mix. Where it is desired to secure a heat-resisting foliated glass, a suitable glass mixture is employed, containing, for instance, a high percentage of borax. Where it is desired that the foliated glass have high insulating properties, then a suitable glass mix—such as one containing potassium or barium—is employed. By suitable glass mixes and by the employment of suitable agents, the desired characteristics and properties may be imparted to the foliated glass, so as to enable its employment for various purposes. Moreover, by heat treating or annealing, the characteristics may be modified so as to adapt the material for particular purposes.

Such foliated glass, particularly after comminution, may be subjected to various surface treatments and coatings. Thus, clear foliated glass may be etched by subjecting it to the fumes of fluoric acid. Various pigment bases, stains, and dyes may be also applied to the foliated glass. Such stains and dyes may be readily applied to etched foliated glass and even, by suitable treatment, to unetched glass.

As an example of coating foliated glass with well-known pigments or chemicals, coating operations may be carried out along with the usual commercial process of making such pigments. Taking, for the purpose of illustration, the ordinary process of making lithopone, and assuming that it is desired to produce a foliated paint, in which the laminae are coated with lithopone; zinc sulphate and barium sulphide solutions may be heated to the usual temperature preparatory to mixing in a striking tank provided with an agitator in which a suitable amount of foliated glass—for instance, five pounds of foliated glass to five pounds of lithopone—may be added during mixing. The lithopone will precipitate on the laminae. The ordinary procedure of calcining the lithopone at the usual temperature may then be proceeded with; in such case, however, it is desired to employ a glass which will calcine at a temperature above 900° F., and which can be secured by employing a borax glass mix, as noted above. After calcination at the usual temperature at which lithopone is calcined, the resultant product can be ground to produce pigments of the desired fineness, and in that product the laminae will be coated with the pigment. In a like manner, foliated glass may be employed in other processes wherein pigments are prepared by a double displacement corresponding to the lithopone process; as, for instance, in the manufacture of cadmium lithopone.

As another example, taking for illustration titanium pigments, which, in accordance with the usual practice, are obtained by treating titaniferous ores with a decomposition agent (most commonly sulphuric acid) to form a solution of the resultant salts, such as titanium sulphates and hydrates: these salts are then precipitated from the solution upon a suitable base, such as blancfixe (barium sulphate), the product calcined at temperatures of 1100° to 1600° C., and thereafter ground to the desired fineness. In accordance with the present invention, foliated glass may be substituted for the base, such as blancfixe, which is ordinarily employed, but otherwise the conventional procedure need not be altered.

The foliated glass may also be coated by simple precipitation of an insoluble salt from a solution of a soluble salt, as by precipitation of antimony sulphide from a solution of antimony chloride, using, for instance, sodium thiosulphate as a precipitating agent. Moreover, in the precipitation of so-called lake pigments, the foliated glass may be substituted for the mineral base ordinarily employed in the manufacture of lake pigments. The foliated glass may also be coated with salts or minerals by dry electrodeposition, or by fuming, or by sublimation.

In employing the foliated glass as the base of a paint or a pigment, the finely divided material, which may be either chemically coated or stained or which may be of colored glass (the coloring matter having been incorporated in the glass batch in accordance with the usual practice), may be mixed with a suitable vehicle, preferably of a varnish nature, such as varnishes, lacquers, boiled linseed oil, or tung oil. Such a paint or pigment may then be applied to the surface to be coated, and upon oxidation of the carrying vehicle, the foliated glass will be bound to the surface and thus provide a coating for it.

In employing the foliated glass as an insulating material, a suitable insulating foliated glass, as above described, may be mixed with any suitable synthetic resin, so as to secure an insulating compound. Such foliated glass is also suitable for use as a heat insulating material without necessarily being finely divided, and as such may be used for insulating refrigerators or the like. To provide a heat insulating material, the foliated glass may be used alone, as by being packed into the wall to be insulated, or may be mixed with other insulating material, such as, for instance, asbestos, mineral wool, cotton, or the like.

A suitable heat-resisting material may also be made by employing a heat-resisting foliated glass, together with a suitable vehicle, so as to secure an insulating compound, or by employing a suitable vehicle, so as to secure a suitable heat-resisting coating. A heat-resisting coating may also be secured by employing a suitable vehicle of high dielectric strength.

A roofing material in the form of rolls or sheets, or as a coating therefor, may be secured by the mixture of foliated glass with asphalt, with or without cement and the customary ingredients. For instance, in roofing material which embodies asphalt, the foliated glass may be dusted onto the sheet or layer of roofing before the asphalt has set. Consequently when the asphalt sets, the roofing is provided with a coating of foliated glass, which is bound to the sheet of material through the asphalt.

Similarly, the foliated glass may be used as a coating material on shingles which are formed of asbestos, with or without cement. In this case, the foliated glass may be dusted onto the shingles before the cement has set, so that when the cement sets, the foliated glass will be bound to the material as a coating. A coating of foliated glass may be likewise applied to any cementitious material, such as concrete, plaster, etc. In carrying out the invention in this way, the foliated glass may be dusted onto the wall or object before the cement has set, so that it will become bound as a coating to the object upon setting of the cement.

Such foliated glass is particularly applicable for use in coating articles, such as pottery, brick, tile and the like, which are to be fired or baked. The foliated glass may be dusted onto the ceramic articles before the final baking, so as to provide a glaze. The finely divided condition of the foliated glass renders it easy to fuse, and the overlapping leaves readily fuse together to produce a highly satisfactory glaze for such articles. Similarly, the foliated glass may be employed in enamel work, where, as for instance in color enameling, foliated glass of the desired color may be distributed on the area desired and the article baked so as to fuse together the leaves of foliated glass and produce a smooth enamel coating. This may be conveniently done by applying the colored foliated glass to the desired area on an article to which the enameling composition has been applied, but before baking.

Moreover, the comminuted foliated glass of the present invention may be employed as a gilt, tint, or glaze for wall paper. In carrying out the invention in this form, the foliated glass may be applied as a coating to wall paper in the same manner in which it is customary to apply bronze or mica powder. This may be accomplished by applying a suitable adhesive to the paper and dusting on the foliated glass, so that as the adhesive sets, the foliated glass is bound to the paper. It is apparent that any desired color effects or tints may be accomplished either by the use of colored glass or by impigmented glass, as hereinbefore described, while the use of transparent glass produces a high luster. Likewise, the foliated glass may be used as a coloring material in color printing upon any material such as paper or fabric, wherein an adhesive is first applied and the pigment, in the form of a powder, dusted on.

The foliated glass embodying this invention is particularly applicable where the coating is designed to prevent corrosion or erosion of pipes, tanks and the like, under ground or above ground. For this purpose a suitable vehicle may be used, such, for instance, as tar acid oil, obtained as a residue from gas works, asphalt, gilsonite and suitable synthetic gums. The product may also be applied to surfaces by the application of heat, serving to fuse the leaves, either after application or during such application. Thus, the product may be sprayed onto a surface and heat applied to cause fusing; or the surface may be preheated and the product sprayed onto the heated surface, so that fusion will take place. A glass having a low fusing point may be used, so that a fused coating may be applied even to other than metal surfaces. Such a coating is particularly useful for under ground pipe lines, since not only are corrosion and erosion prevented, when by chemical action, but also when by electrolysis. As the inside of a tank, the coating will act as a chemical-resisting lining.

Such foliated glass may also be advantageously employed as a filler in ordinary mixed paints or paint bases, and when used in this connection the painted surface has many of the advantageous characteristics of paint wherein the foliated glass is employed as the base.

When using the foliated glass of the present invention as a coating composition or as an ingredient of a coating composition, it is apparent that a coating is provided which possesses a high resistance to the action of those forces which ordinarily attack the surfaces of articles. As is well known, glass can be so composed that it possesses a high resistance to the action of strong chemicals, and, accordingly, by properly selecting the ingredients of the foliated glass, coatings of high chemical resistance may be provided. Such coatings may even be provided in the form of a paint, when a vehicle, possessing to some extent high chemical-resisting properties, is selected. The fact that the base of such coating compositions as are contemplated by the present invention, is glass, which does not readily oxidize and does not deteriorate under the action of weather or sunlight, renders such compositions particularly adaptable for coating bases which are to be used on the outside.

From the foregoing description, it is apparent that the manufacture and process of preparing the same, as herein disclosed, are susceptible of many uses and modifications. It is to be distinctly understood, therefore, that the invention is not limited to the specific details which have been hereinbefore described, but that such modifications and the use of such individual features and sub-combinations of features as do not depart from the spirit of this invention, are contemplated by and within the scope of the appended claims.

Having thus described the invention, what is claimed is:

1. A manufacture comprising surface-treated foliated glass.

2. A manufacture comprising coated foliated glass.

3. A coating composition comprising foliated glass and a vehicle.

4. A coating composition comprising foliated glass and a binder.

5. A process of producing foliated glass comprising subjecting glass to attenuation until foliated, grinding and heat treating the particles of foliated glass.

6. In the art of making coating compositions, the process comprising, subjecting glass to attenuation until foliated, grinding the foliated glass and surface treating the particles of foliated glass.

7. In the art of making coating compositions, the process comprising, subjecting glass to attenuation until foliated, and coating the foliated glass.

8. In the art of making coating compositions, the process comprising, subjecting glass to attenuation until foliated, grinding the foliated glass, and calcining the coated foliated glass.

9. In the art of making coating compositions, the process comprising, subjecting glass to attenuation until foliated, and incorporating the foliated glass in a binder.

10. A manufacture comprising, foliated glass particles coated with a mineral pigment.

11. A coating composition comprising, foliated glass incorporated in a vehicle capable of drying to form a binder.

12. A coating composition comprising, foliated glass incorporated with a plastic vehicle capable of setting to form a binder.

PHILIP E. HARTH.

CERTIFICATE OF CORRECTION.

Patent No. 2,233,259. February 25, 1941.

PHILIP E. HARTH.

It is hereby certified that error appears in the printed specification of the above numbered patent requiring correction as follows: Page 1, first column, line 43, for the word "and" read --any--; line 51, for "clasifiers" read --classifiers--; page 3, second column, line 31, claim 8, for "grinding" read --coating--; and that the said Letters Patent should be read with this correction therein that the same may conform to the record of the case in the Patent Office.

Signed and sealed this 1st day of April, A. D. 1941.

(Seal)

Henry Van Arsdale,
Acting Commissioner of Patents.